United States Patent
Kappel

(10) Patent No.: US 6,560,060 B1
(45) Date of Patent: May 6, 2003

(54) IMPORT/EXPORT ELEMENT WITH SCREW-MOUNTED BEVEL GEAR FOR ROTATION

(75) Inventor: Glendon D. Kappel, Eagan, MN (US)

(73) Assignee: Plasmon IDE, Inc., Colorado Springs, CO (US)

( * ) Notice: Subject to any disclaimer, the term of this patent is extended or adjusted under 35 U.S.C. 154(b) by 119 days.

(21) Appl. No.: 09/589,554

(22) Filed: Jun. 7, 2000

(51) Int. Cl.[7] .............................................. G11B 15/18
(52) U.S. Cl. .......................... 360/92; 360/93; 369/177; 369/178
(58) Field of Search ............................. 369/34, 36, 37, 369/38, 39, 178, 176, 177; 360/92, 93, 94

(56) References Cited

U.S. PATENT DOCUMENTS

| | | |
|---|---|---|
| 4,271,440 A | 6/1981 | Jenkins |
| 4,504,936 A | 3/1985 | Faber |
| 4,607,354 A | 8/1986 | Ishibashi |
| 4,608,679 A | 8/1986 | Rudy |
| 4,614,474 A | 9/1986 | Sudo |
| 4,654,727 A | 3/1987 | Blum |
| 4,675,856 A | 6/1987 | Rudy |
| 4,742,504 A | 5/1988 | Takasuka |
| 4,779,151 A | 10/1988 | Lind |
| 4,787,074 A | 11/1988 | Deck |
| 4,815,055 A | 3/1989 | Fago, Jr. |

(List continued on next page.)

FOREIGN PATENT DOCUMENTS

| | | | |
|---|---|---|---|
| EP | 0 280 263 | | 8/1988 |
| EP | 0389160 | * | 9/1990 |
| EP | 0935246 | * | 8/1999 |
| JP | 59-30263 | | 2/1984 |
| JP | 59-36003 | | 2/1984 |
| JP | 59-231763 | | 12/1984 |
| JP | 61-240474 | | 10/1986 |
| JP | 1-50275 | | 2/1989 |
| JP | 09022561 | * | 1/1997 |

Primary Examiner—Hoa T. Nguyen
Assistant Examiner—Dzung C. Nguyen
(74) Attorney, Agent, or Firm—Gerald E. Helget; Nelson R. Capes; Briggs and Morgan

(57) ABSTRACT

In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element which rotates the cartridge 180 degrees after moving the cartridge from the access opening to the media transport element, including: a cartridge holder adapted to receive the media cartridge from the access opening; a lead screw mounted in a first direction between a first point and a second point and rotating about a first axis parallel to the first direction; a keyed nut threaded on the lead screw, the keyed nut having a first slot and a second slot, and a rail alternately engaging the first slot and second slot, the rail extending between the first point and the second point; a detent adapted to alternately engage the first and second slot adjacent the rail at the second point; a first bevel gear fastened to the keyed nut; and a second bevel gear meshing with the first bevel gear and a shaft driven by the second bevel gear and connected to the cartridge holder.

22 Claims, 5 Drawing Sheets

U.S. PATENT DOCUMENTS

| | | |
|---|---|---|
| 4,815,056 A | 3/1989 | Toi |
| 4,817,070 A | 3/1989 | Hug |
| 4,817,071 A | 3/1989 | Carlson |
| 4,839,758 A | 6/1989 | Honjoh |
| 4,846,619 A | 7/1989 | Crabtree |
| 4,853,916 A | 8/1989 | Tomita |
| 4,878,137 A | 10/1989 | Yamashita |
| 4,912,581 A | 3/1990 | Watanabe |
| 4,928,245 A * | 5/1990 | Moy et al. |
| 4,972,277 A | 11/1990 | Sills et al. .................... 360/92 |
| 4,998,232 A | 3/1991 | Methlie |
| 5,001,582 A | 3/1991 | Numasaki |
| 5,010,536 A | 4/1991 | Wanger |
| 5,014,255 A | 5/1991 | Wanger |
| 5,033,038 A | 7/1991 | Kobayashi |
| 5,036,503 A | 7/1991 | Tomita |
| 5,040,159 A | 8/1991 | Oliver |
| 5,043,962 A | 8/1991 | Wanger |
| 5,056,073 A | 10/1991 | Fitzgerald |
| 5,060,211 A | 10/1991 | Blanding |
| 5,062,093 A | 10/1991 | Christi |
| 5,065,379 A | 11/1991 | Smith |
| 5,101,387 A | 3/1992 | Wanger |
| 5,123,000 A | 6/1992 | Fitzgerald |
| 5,150,341 A | 9/1992 | Shibayama |
| 5,153,862 A | 10/1992 | Taylor |
| 5,206,845 A | 4/1993 | Baxter |
| 5,220,548 A | 6/1993 | Nakatsukasa |
| 5,228,016 A | 7/1993 | Menke |
| 5,231,552 A | 7/1993 | Schneider |
| 5,255,251 A | 10/1993 | Fitzgerald |
| 5,345,350 A | 9/1994 | Ellis |
| 5,362,192 A | 11/1994 | Dang |
| 5,377,121 A | 12/1994 | Dimitri |
| 5,431,520 A | 7/1995 | Brugger |
| 5,471,561 A | 11/1995 | Cowgill |
| 5,487,579 A | 1/1996 | Woodruff |
| 5,502,697 A | 3/1996 | Taki |
| 5,517,473 A | 5/1996 | Permut .................... 369/30.48 |
| 5,546,366 A | 8/1996 | Dang |
| 5,603,821 A | 2/1997 | McPherson |
| 5,659,434 A | 8/1997 | Yamakawa et al. ........... 360/69 |
| 5,680,375 A | 10/1997 | Christie, Jr. |
| 5,680,377 A * | 10/1997 | Dang et al. .................... 369/36 |
| 5,764,615 A | 6/1998 | Ware |
| 5,798,997 A | 8/1998 | Ware |
| 5,813,009 A | 9/1998 | Johnson |
| 5,894,469 A | 4/1999 | Usami et al. ................ 369/192 |
| 5,959,803 A * | 9/1999 | Okamoto |
| 5,966,366 A | 10/1999 | Pollard ........................ 360/92 |
| 5,975,450 A * | 11/1999 | Leger et al. ................. 242/337 |
| 5,995,459 A | 11/1999 | Kappel |
| 5,999,356 A * | 12/1999 | Dimitri et al. ................. 360/71 |
| 6,027,296 A | 2/2000 | Meier .................... 198/468.01 |
| 6,094,322 A | 7/2000 | Nakagomi |
| 6,141,178 A * | 10/2000 | Nakajima et al. ............. 360/92 |
| 6,175,466 B1 * | 1/2001 | Hori et al. ..................... 360/92 |
| 6,266,316 B1 | 7/2001 | Luffel et al. .................. 360/92 |
| 6,330,217 B1 | 12/2001 | Paul et al. ..................... 360/92 |

\* cited by examiner

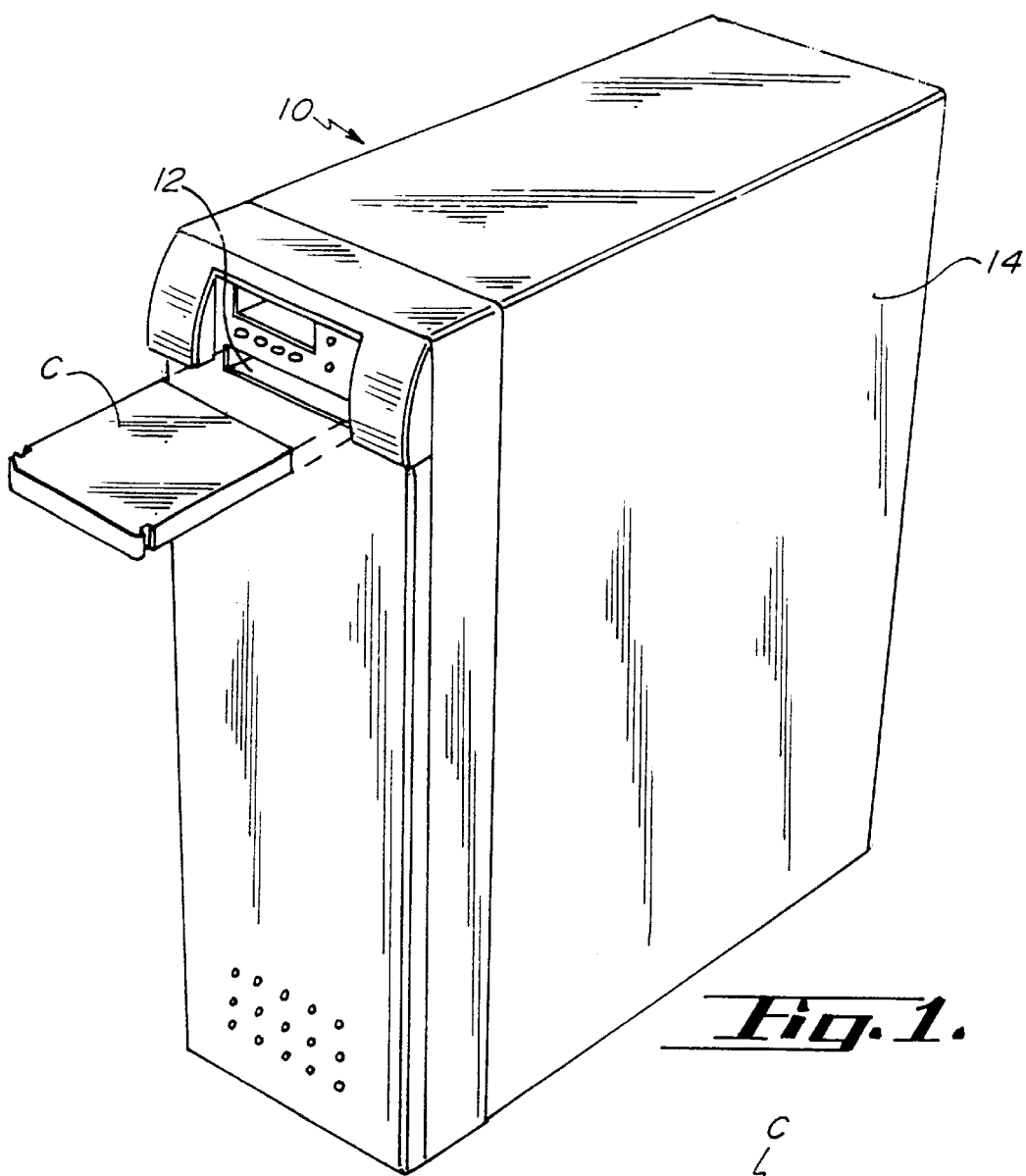
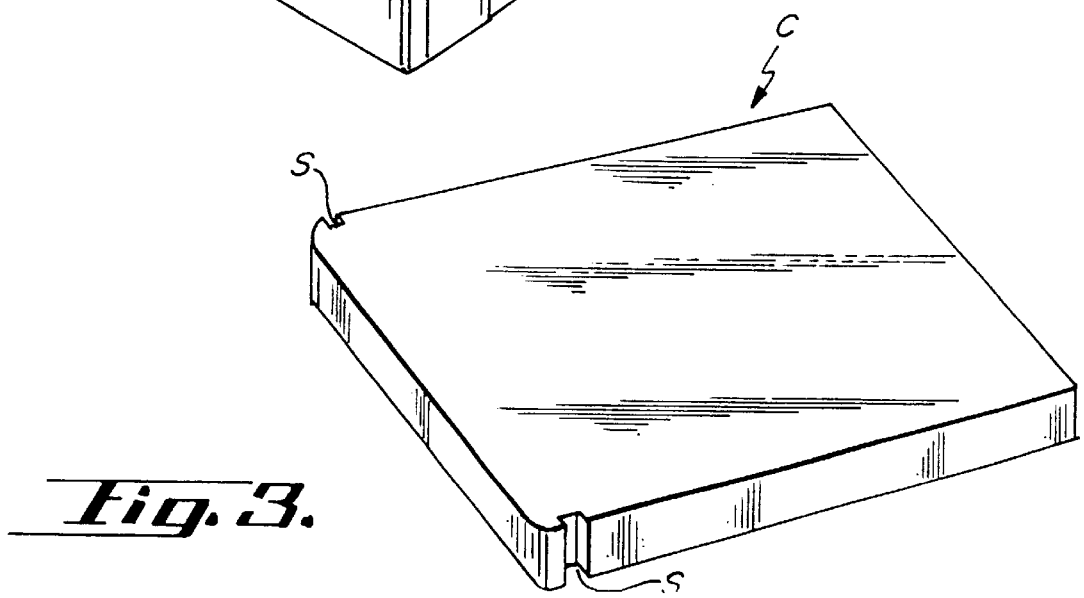

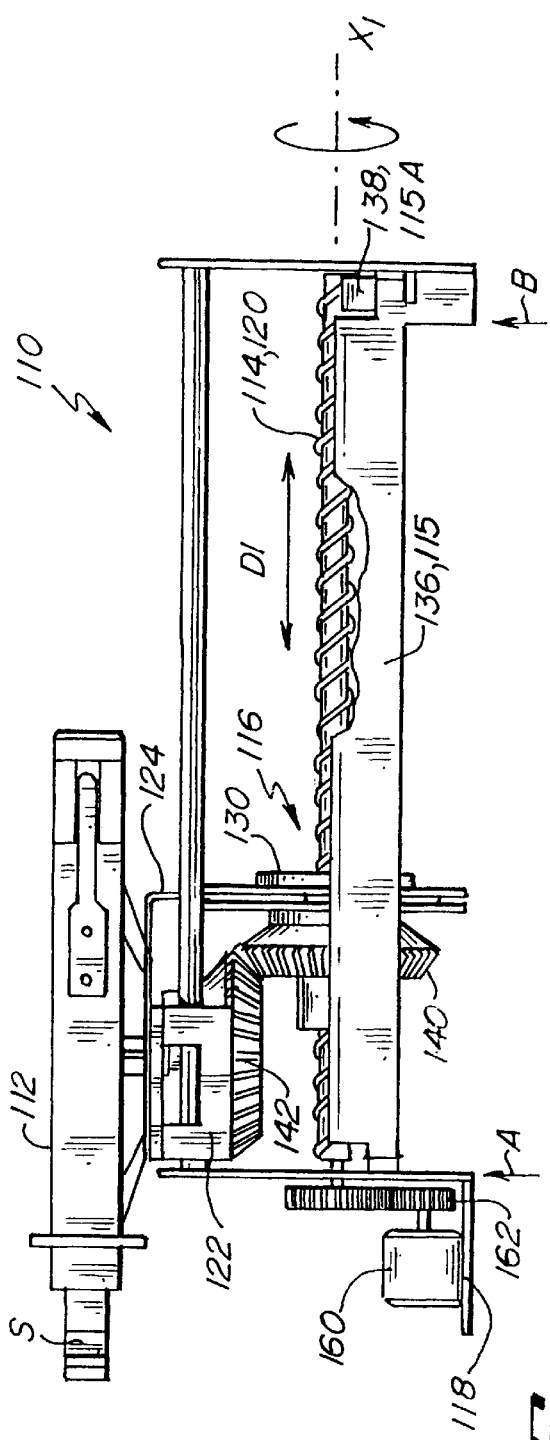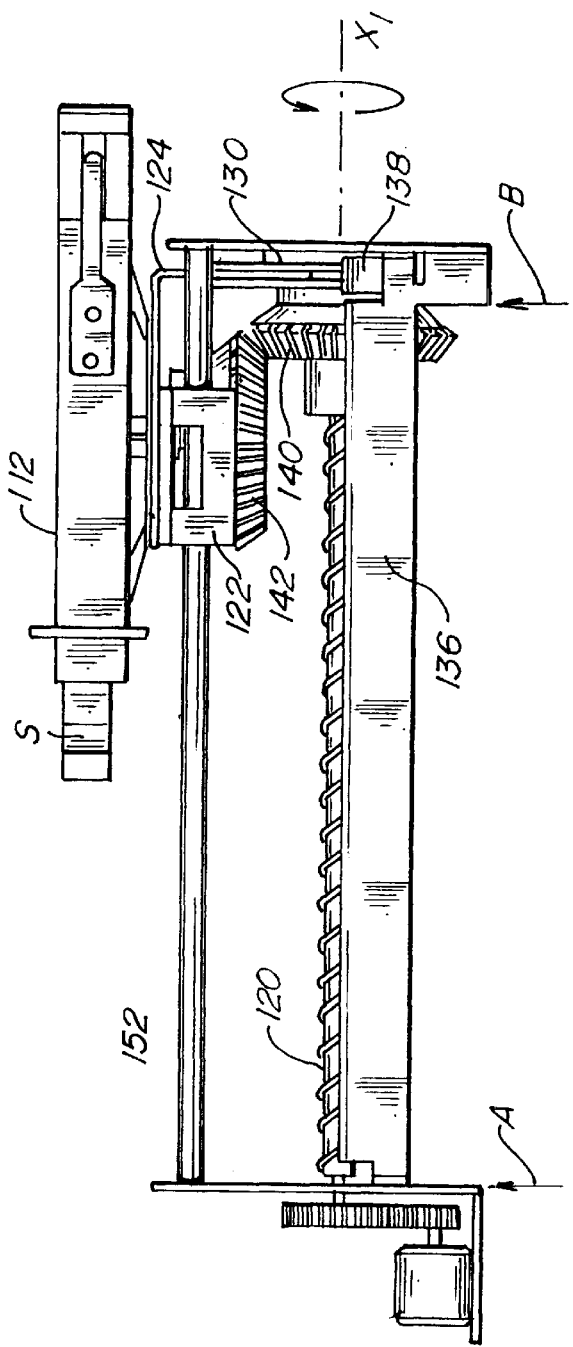

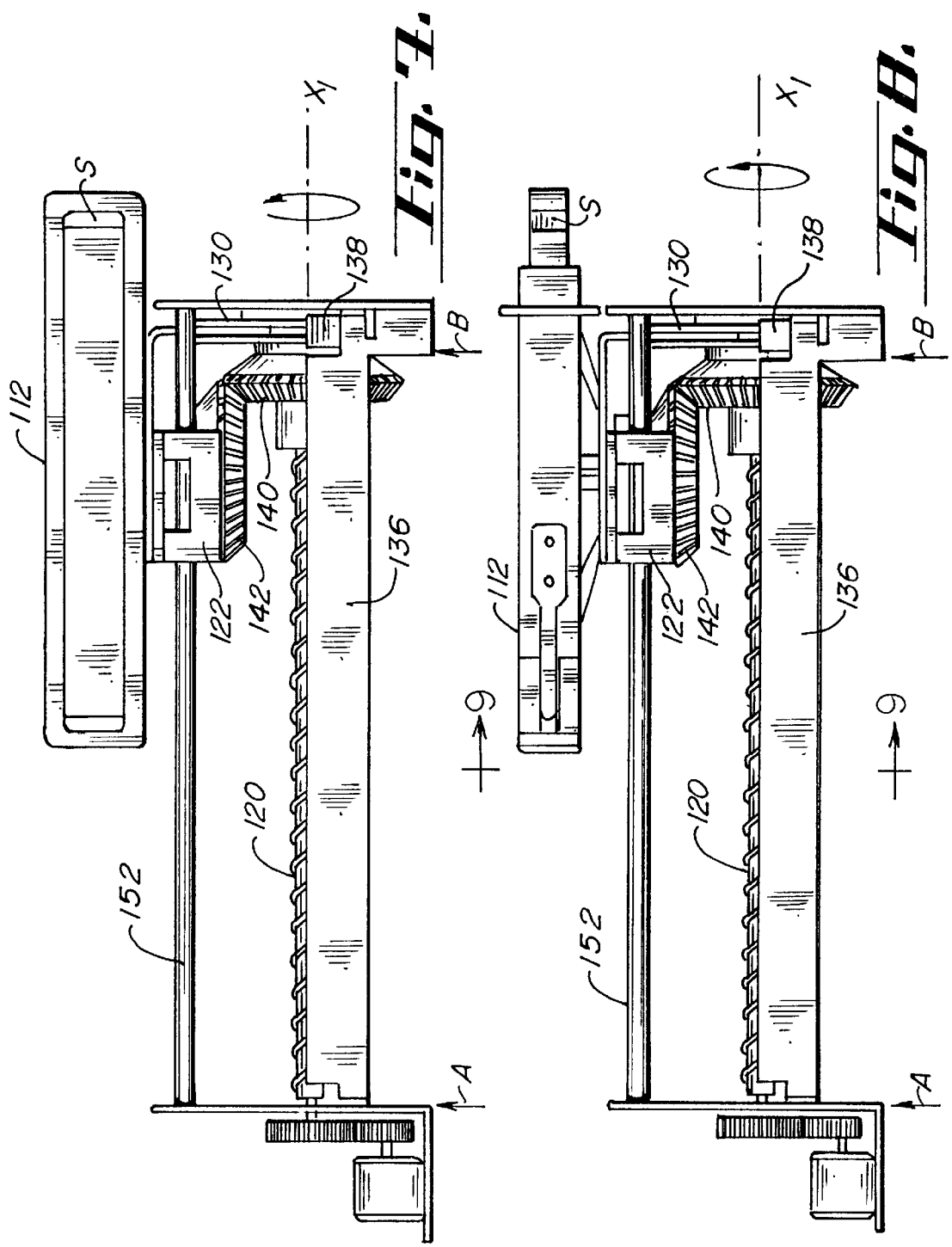

IMPORT/EXPORT ELEMENT WITH SCREW-MOUNTED BEVEL GEAR FOR ROTATION

BACKGROUND OF THE INVENTION

Storage media library systems (jukeboxes) are devices which contain multiple storage media drives and many pieces of storage media to accommodate installations requiring access to large numbers of storage media, such as optical discs, compact discs and tape cartridges.

A typical storage media library is generally shown in the references as reference numeral 10.

Arranged within the data storage library is at least one and preferably several media storage elements 40. The media storage elements 40 hold the storage media when the storage media are not being read or written to. The storage media can be any media that can be used to record information, such as data or graphics. The recording means may be magnetic, optical, or any other equivalent recording means known in the storage media art. Preferably, the storage media are compact discs (CDs) or tapes. In the application of the present invention, the storage media are housed in cartridges C. Each cartridge C has a pair of slots S at one end which are used by the robotics of the data storage library for moving the cartridge C from location to location within the data storage library.

Also arranged within the data storage library 10 is at least one and preferably several data transfer elements 50, which are used to read and write information on the storage media. Preferably, the data transfer elements 50 are compact disc drives (CD drives) or tape drives, but may also be any equivalent device such as an optical disc drive, a floppy disc drive, or a hard drive.

A media transfer element 70 is movable within the data storage library 10 to move the storage media among media storage elements 40 and data transfer elements 50.

Media, in cartridges C, are loaded into the data storage library by the operator by use of an import/export element 80. The cartridges C are inserted into the data storage library 10 through an access opening 12 in data storage library housing 14. The cartridges are inserted with the slots S facing the operator. Inserting a cartridge with the slots S away from the operator would be unnatural and annoying for most operators.

However, once inside the data storage library 10, the cartridge C must be rotated 180 degrees so that the slots S are available for gripping by robotics such as the media transport element 70 which typically use "pickers" to grip the cartridge C by the slots S.

Complications may arise when trying to populate the data storage library 10 with a number of storage media.

First, the operator should not be able to gain access directly to the interior of the data storage library. The various moving mechanisms within the data storage library can cause severe injury to an operator's hand and fingers.

Furthermore, the data storage library must know at all times which particular media have been placed into it, and in which of the many media storage elements 40 the media reside. If operators are allowed access to the interior of the data storage library, it becomes impossible for the data storage library to know with assurance the location of each media.

For all of the above reasons, media must be introduced into and removed from the data storage library only through the import/export element 80, while the library is in operation.

In addition, once the media are loaded and rotated 180 degrees, they must be moved internally within the library for access by the media transport element 70.

There is a need for an improved import/export element which rotates the media 180 degrees between insertion and the robotics while at the same time translating the media within the data storage library, with a minimum of complexity and number of components.

SUMMARY OF THE INVENTION

In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;

(b) means for translating said cartridge holder between a first point and a second point;

(c) means for rotating said cartridge holder 180 degrees at said second point; and means for driving said translating means and said rotating means.

A principal object and advantage of the present invention is that it rotates the cartridge through 180 degrees only after it translates the cartridge from one point (near the access opening) to a second point (near the media store). Such an implementation potentially allows closer tolerances around the import/export element between first point and the second point.

Another principal object and advantage of the present invention is that it carries out the above function using a single driving motor.

Another principal object and advantage of the present invention is that involves fewer moving parts than earlier mechanisms.

Another principal object and advantage of the present invention is that it allows only one-way rotation of the cartridge.

Another principal object and advantage of the present invention is that it allows more than 180 degrees of rotation of the cartridge.

BRIEF DESCRIPTION OF THE DRAWINGS

FIG. 1 is a perspective view of a data storage library in which the present invention is used, showing a cartridge C being inserted into the data storage library.

FIG. 3 is a perspective view of a media cartridge for use with the import/export element of the present invention.

FIG. 5 is a cross-section of the import/export element of the present invention along the lines 5 of FIG. 4 showing the import/export element positioned at one end of its travel.

FIG. 6 is the same as FIG. 5, with the import/export element positioned at the other end of its travel.

FIG. 7 is the same as FIG. 6, but showing rotation of the cartridge holder 90 degrees from the position in FIG. 6.

FIG. 8 is the same as FIG. 6, but showing rotation of the cartridge holder 180 degrees from the position in FIG. 6.

DETAILED DESCRIPTION OF THE PREFERRED EMBODIMENTS

Figure 2:
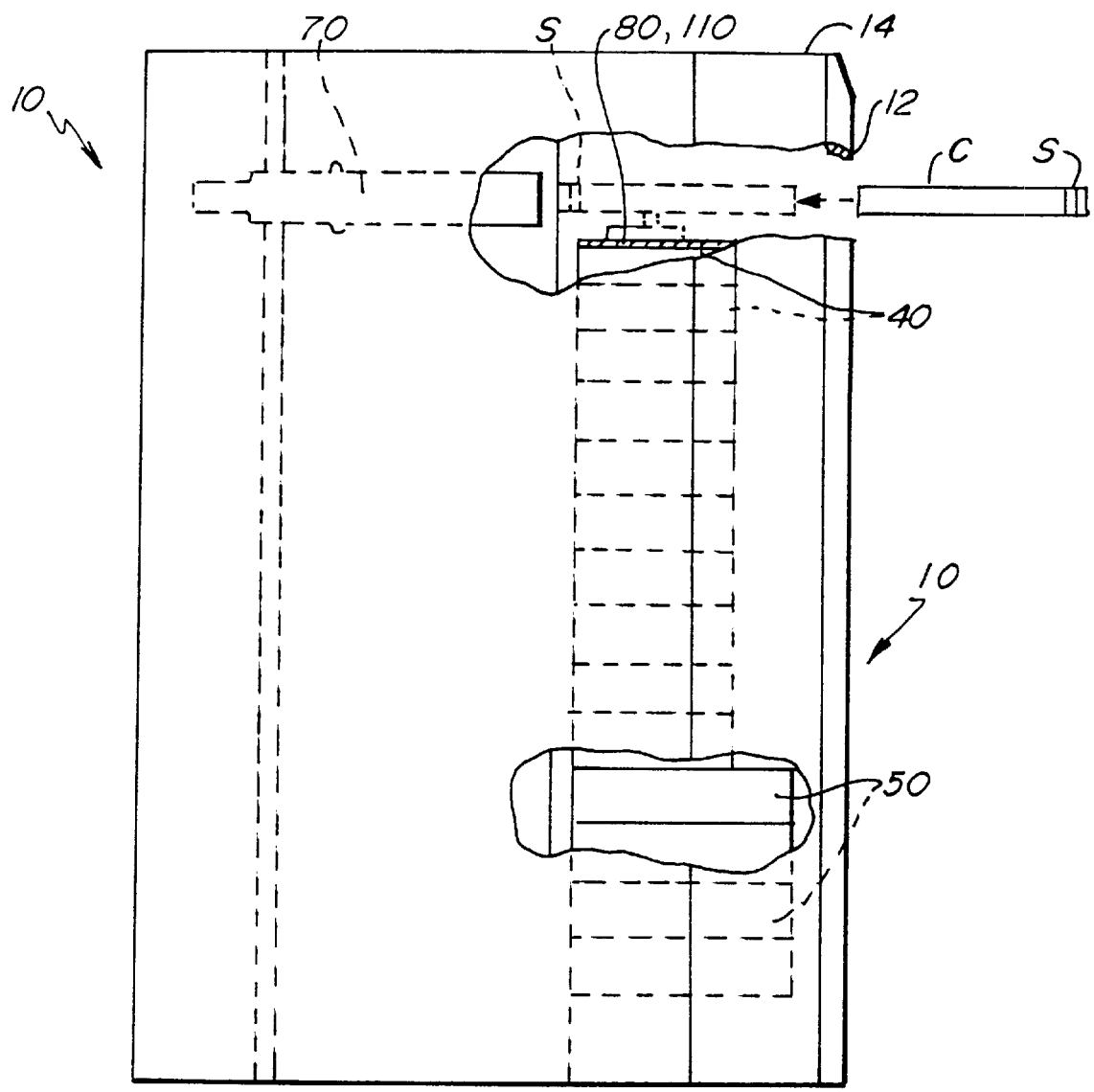
FIG. 2 is a schematic cross-section of the data storage library of FIG. 1, showing internal components in phantom, with some structure cut away to show the import/export element of the present invention.
Figure 9:
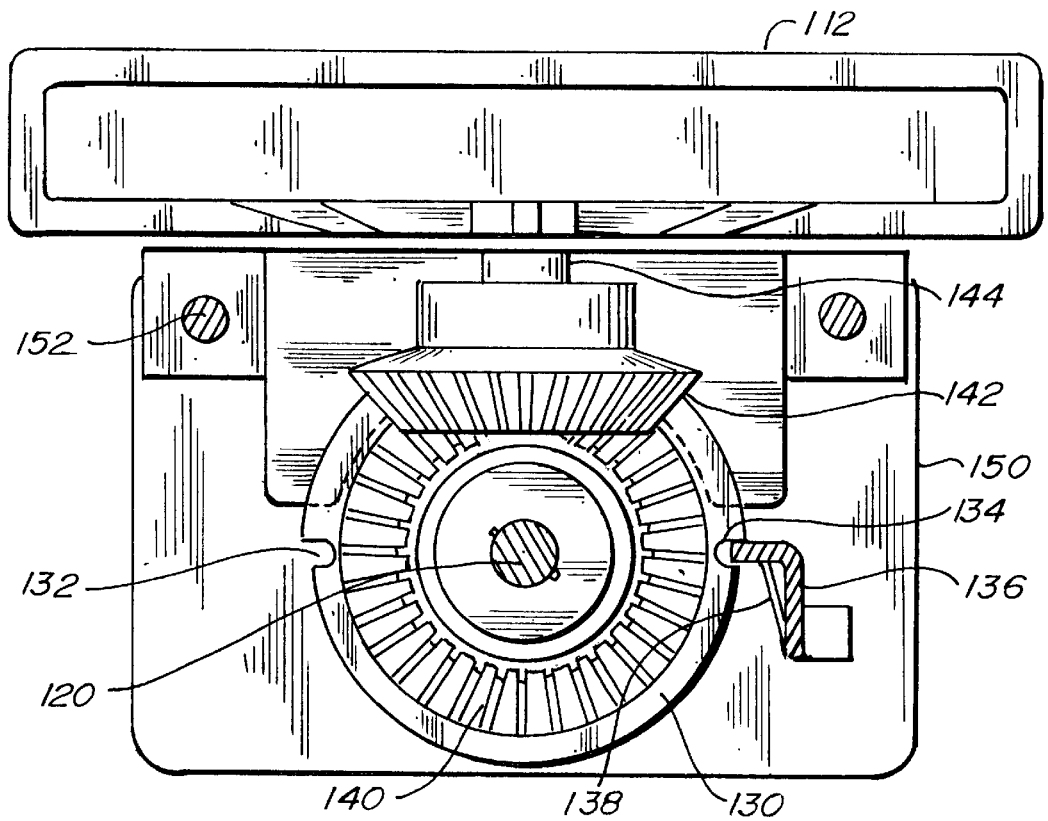
FIG. 9 is a cross-section take along the lines 9 of FIG. 8.

The import/export element of the present invention is generally shown in the Figures as reference numeral 110.

Referring first to FIG. 5, the import/export element 110 further comprises a cartridge holder 112 adapted to receive the media cartridge C from the access opening 12. The cartridge C is inserted into the cartridge holder 112 with the slots S protruding from the cartridge holder 112.

The import/export element 110 also comprises a means 114 for linearly translating the cartridge holder 112 between a first point A and a second point B.

The import/export element 110 also comprises a means 115 for preventing rotation of the cartridge holder between the first point and the second point.

The import/export element 110 also comprises a means 115A for allowing one-way rotation of the cartridge holder at the second point.

The import/export element 110 further comprises a means 116 for rotating the cartridge holder 112 at least 180 degrees at the second point B.

The import/export element 110 also comprises a means 118 for driving the linear translating means and the rotating means 116.

More particularly, but without intending to list exclusive embodiments, the means 114 for translating the cartridge holder 112 comprises a lead screw 120 mounted in a first direction D1 between the first point A and the second point B. The lead screw 120 rotates about a first axis X1 parallel to direction D1. The means for linear translation could be any equivalent means, such as a belt, chain, or pulley.

More particularly, but without intending to list exclusive embodiments, the means 114 for translating also comprises a cartridge holder carrier 122 engaging the lead screw 120 and connected to the cartridge holder 112 for translation of the cartridge holder 112 along the first axis X1. The cartridge holder carrier 122 is preferably connected to a key nut 130 by a connector 124. The keyed nut 130 is described below.

Figure 4:
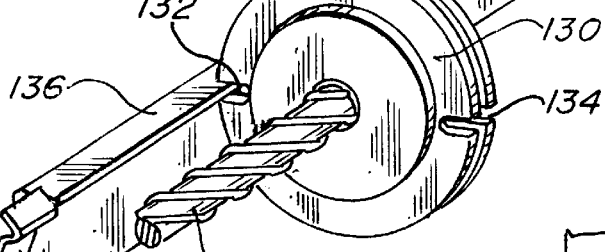
FIG. 4 is a perspective view of the import/export element of the present invention.

More particularly, but without intending to list exclusive embodiments, the means 115 for preventing rotation of the cartridge holder between the first point and the second point further comprises a keyed nut 130 threadably engaging the lead screw 120 as shown in FIG. 4. The keyed nut 130 has a first slot 132 and a second slot 134. A rail 136 alternately engages the first slot 132 and second slot 134 and extends between the first point A and the second point B.

More particularly, but without intending to list exclusive embodiments, the means 115A for allowing one-way rotation of the cartridge holder at the second point further preferably comprises a detent member 138 adapted to alternately engage the first slot 132 and second slot 134 adjacent the rail 136 at the second point B.

More particularly, but without intending to list exclusive embodiments, the means for rotating 116 further preferably comprises a first bevel gear 140 fastened to the keyed nut 130, and a second bevel gear 142 meshing with the first bevel gear 140 and attached to a shaft 144, with the shaft 144 connected to the cartridge holder 112. The means for rotation could be any equivalent means, such as a second lead screw.

It will be seen from FIGS. 5 through 8 that, as the lead screw 120 rotates, the keyed nut 130, constrained against rotation because one of the slots 132, 134 engages the rail 136, moves along the lead screw 120 from point A to point B. The cartridge holder carrier 122, attached to the keyed nut 130 by the connector 124, is moved along axis X1 from point A toward point B.

When the keyed nut 130 reaches point B, the slot 132, 134 that is engaging the rail 136 moves off the rail 136 and immediately encounters the detent member 138 adjacent the rail 136 at point B. The detent member 138 then engages the slot 132, 134 that previously engaged the rail 136.

The detent member 138 is constructed as to allow the keyed nut 130 to rotate in one direction only. Any suitable construction that achieves this function may be employed.

Figure 4A:
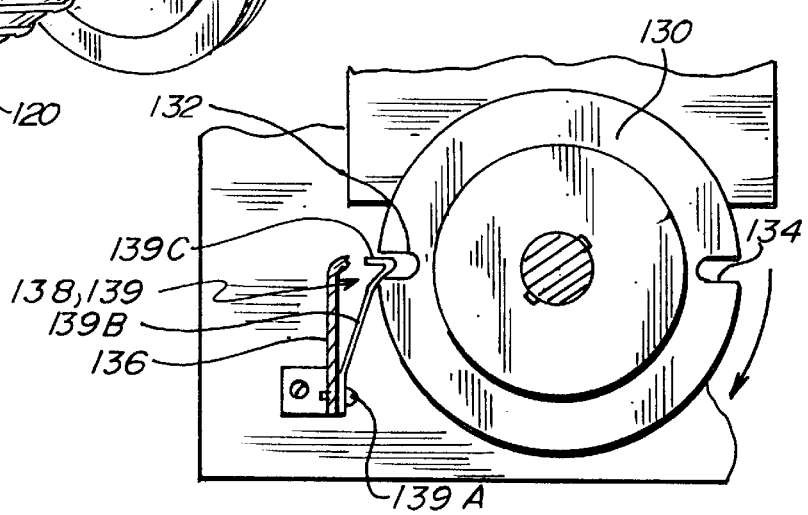
FIG. 4A is a detailed cross-section showing the construction of the detent member.

Preferably, the detent member 138 is flexible and deflectable, so that as the lead screw 120 continues to turn in the direction shown by the arrow in FIG. 6, the keyed nut 130 deflects the detent member 138 out of the slot 132, 134, allowing the keyed nut 130 to rotate on the lead screw 120. However, the detent member 138 is also constructed so that the keyed nut 130 cannot rotate in a direction opposite to that shown by the arrow in FIG. 6. For example, as shown in FIG. 4A, the detent member 138 may comprise a leaf spring 139 attached to the rail 136 by a screw 139A. The leaf spring 139 suitably has a body 139B and a head 139C that engages one of the slots 132, 134 in the keyed nut 130. The head 139C is suitably constructed so that rotation of the keyed nut 130 in the direction shown by the arrow in FIG. 4A deflects the leaf spring 139 out of the slot 132, 134. However, rotation of the keyed nut 130 in the opposite direction is prevented by the head 139C.

As the lead screw 120 continues to turn, the keyed nut 130, now free to rotate with the lead screw 120, in turn rotates the first bevel gear 140, and the first bevel gear 140, meshing with the second bevel gear 142, causes the shaft 144 to turn the cartridge holder 112. The cartridge holder 112 may only turn 180 degrees, because as the keyed nut 130 turns 180 degrees, the other slot 132, 134 encounters the detent 138 and rotation stops. If desired, rotation can be continued by continued rotation of the lead screw 120 in the direction shown by the arrow in FIG. 6.

However, if the direction of rotation of the lead screw 120 is now reversed, the keyed nut 130 cannot rotate, so instead moves back along the lead screw 120 toward point A, immediately encountering the rail 136, where the other slot 132, 134 engages the rail 136. The keyed nut 130, continued to be restrained against rotation by the rail 136, now moves to point A along the lead screw 120.

The various elements of the import/export element 110, specifically the lead screw 120, keyed nut 130, rail 136, detent member 138, first bevel gear 140, and second bevel gear 142 may be contained in an import/export element housing 150.

Preferably, the import/export element housing 150 further comprises at least one housing rail 152 extending in the first direction D1, and the cartridge holder carrier 122 slidingly engages the housing rail 152. This will ensure that there is no "play" in the mechanism as it moves along the lead screw 120.

The means 118 for driving the linear translating means 114 and rotating means 116 may be any source of rotational motion, such as a belt or gear. Preferably, the means 118 for driving comprises an electric motor 160 geared to the lead screw 120 through gears 162.

Preferably, the keyed nut 130 and first bevel gear 140 are of integral, one-piece construction. For example, they may be molded into a single piece of plastic.

In operation, the operator loads the cartridge C into the cartridge holder 112 as the cartridge holder carrier 112 is at a point nearest the access opening 12 (which may be either point A or point B). As discussed, the operator loads the cartridge C so that the slots S protrude outside the cartridge holder 112. By any suitable means, for example, tripping of a sensor within the cartridge holder carrier 112, the driving means 118 is energized, causing rotation of the lead screw 120 and motion of the cartridge holder carrier 122 towards the media store (which is the other point, A or B). When the cartridge holder carrier reaches point B, the cartridge holder carrier 122 is rotated 180 degrees so the slots S are facing toward the media store and media transport element 170. Media transport element 170 may then grip the cartridge by the slots S and move it elsewhere in the data storage library 10. To remove a cartridge from the library, the process is reversed.

The present invention maybe embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;
   (b) means for linearly translating said cartridge holder between a first point and a second point; and
   (c) means for preventing rotation of said cartridge holder between said first point and said second point;
   (d) means for allowing one-way rotation of said cartridge holder 180 degrees at said second point;
   (e) means for rotating said cartridge holder at least 180 degrees at said second point;
   (f) means for driving said linear translating means and said rotating means; and
   (g) wherein said means for linearly translating the cartridge holder further comprises a lead screw mounted in a first direction between said first point and said second point and rotating about a first axis parallel to said first direction and a cartridge holder carrier engaging said lead screw and connected to said cartridge holder for translation of said cartridge holder along said first axis wherein said means for preventing rotation of said cartridge holder between said first point and said second point further comprises a keyed nut threadably engaging said lead screw, said keyed nut having a first slot and a second slot, and a rail alternately engaging said first slot and said second slot, said rail extending between said first point and said second point.

2. The import/export element of claim 1, wherein said means for driving said rotating means comprises an electric motor.

3. The import/export element of claim 1, wherein said means for allowing one-way rotation of said cartridge holder at said second point further comprises a detent member adapted to alternately engage said first and said second slot adjacent said rail at said second point.

4. The import/export element of claim 3, wherein said means for rotating said cartridge holder at least 180 degrees at said second point further comprises:

a) a first bevel gear fastened to said keyed nut; and
   b) a second bevel gear meshing with said first bevel gear and a shaft driven by said second bevel gear and connected to said cartridge holder.

5. The import/export element of claim 4, further comprising an import/export element housing containing said lead screw, said keyed nut, said rail, said detent member, said first bevel gear, and said second bevel gear.

6. The import/export element of claim 4, wherein said keyed nut and said first bevel gear are of integral one-piece construction.

7. The import/export element of claim 3, wherein said detent member further comprises a flexible, deflectable member.

8. The import/export element of claim 7, wherein said flexible, deflectable member further comprises a leaf spring.

9. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:

(a) a cartridge holder adapted to receive the media cartridge from the access opening;
   (b) a lead screw connected to said cartridge holder and mounted in a first direction between a first point and a second point and rotating about a first axis parallel to said first direction and a cartridge holder carrier engaging said lead screw and connected to said cartridge holder for linear translation of said cartridge holder along said first axis;
   (c) means for preventing rotation of said cartridge holder between said first point and said second point;
   (d) means for allowing one-way rotation of said cartridge holder at said second point;
   (e) means for rotating said cartridge holder at least 180 degrees at said second point;
   (f) means for driving said rotating mean; and
   (g) wherein said means for preventing rotation of said cartridge holder further comprises a keyed nut threadably engaging said lead screw, said keyed nut having a first slot and a second slot, and a rail alternately engaging said first slot and said second slot, said rail extending between said first point and said second point.

10. The import/export element of claim 9, wherein said means for allowing one-way rotation of said cartridge holder at said second point further comprises a detent member adapted to alternately engage said first and said second slot adjacent said rail at said second point.

11. The import/export element of claim 10, wherein said detent member further comprises a flexible, deflectable member.

12. The import/export element of claim 11, wherein said flexible, deflectable member further comprises a leaf spring.

13. The import/export element of claim 11, wherein said means for driving said lead screw further comprises an electric motor.

14. The import/export element of claim 11, wherein said keyed nut and said first bevel gear are of integral one-piece construction.

15. The import/export element of claim 9, wherein said means for rotating said cartridge holder at least 180 degrees at said second point further comprises:
   a) a first bevel gear fastened to said keyed nut; and
   b) a second bevel gear meshing with said first bevel gear and a shaft driven by said second bevel gear and connected to said cartridge holder.

16. The import/export element of claim 15, further comprising an import/export element housing containing said lead screw, said keyed nut, said rail, said detent member, said first bevel gear, and said second bevel gear.

17. The import/export element of claim 9, wherein said means for driving said rotating means comprises an electric motor.

18. The import/export element of claim 15, wherein said keyed nut and said first bevel gear are of integral one-piece construction.

19. In a data media storage library for storing and accessing storage media, the storage media being contained in cartridges, the data media storage library having a library housing, an access opening in the library housing for inserting cartridges, a storage array within the library housing including a number of storage locations, a plurality of media storage elements adapted to hold the storage media, a plurality of data transfer elements adapted to read and write information on the storage media, and a media transport element within the library housing adapted to move the storage media between the media storage element and the data transfer element, an import/export element comprising:
   a) a cartridge holder adapted to receive the media cartridge from the access opening;
   b) a lead screw mounted in a first direction between a first point and a second point and rotating about a first axis parallel to said first direction;
   c) a keyed nut threadably engaging said lead screw, said keyed nut having a first slot and a second slot, and a rail alternately engaging said first slot and said second slot, said rail extending between said first point and said second point;
   d) a detent member adapted to alternately engage said first and said second slot adjacent said rail at said second point;
   e) a first bevel gear fastened to said keyed nut; and
   f) a second bevel gear meshing with said first bevel gear and a shaft driven by said second bevel gear and connected to said cartridge holder; wherein rotation of said lead screw moves said keyed nut along said first axis, and wherein said rail prevents the rotation of said keyed nut between said first point and said second point, and wherein said detent member allows the rotation of said keyed nut in one direction only; and
   g) means for driving said lead screw.

20. The import/export element of claim 19, further comprising an import/export element housing containing said lead screw, said keyed nut, said rail, said detent member, said first bevel gear, and said second bevel gear.

21. The import/export element of claim 19, wherein said detent member further comprises a flexible, deflectable member.

22. The import/export element of claim 21, wherein said flexible, deflectable member further comprises a leaf spring.

* * * * *